United States Patent
Simomichi et al.

(10) Patent No.: US 6,760,528 B2
(45) Date of Patent: Jul. 6, 2004

(54) RESIN COATED OPTICAL FIBER

(75) Inventors: Tsuyoshi Simomichi, Sakura (JP); Keiji Ohashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 191 days.

(21) Appl. No.: 10/179,578

(22) Filed: Jun. 24, 2002

(65) Prior Publication Data

US 2003/0012536 A1 Jan. 16, 2003

(30) Foreign Application Priority Data

Jun. 29, 2001 (JP) ................................. P2001-199777

(51) Int. Cl.$^7$ ............................ G02B 6/02; G02B 6/16; G02B 6/18; G02B 6/20; G02B 6/22
(52) U.S. Cl. .................... 385/128; 385/100; 385/109; 385/113; 385/115; 385/123; 385/126; 385/127
(58) Field of Search .................. 385/49, 100, 105, 385/109, 113, 115, 123, 126, 127, 128, 143; 264/103

(56) References Cited

U.S. PATENT DOCUMENTS

| | | | | |
|---|---|---|---|---|
| 4,114,981 A | * | 9/1978 | Ishida et al. | 385/128 |
| 5,018,828 A | * | 5/1991 | Ohdaira et al. | 385/143 |
| 5,084,221 A | * | 1/1992 | Matsuno et al. | 264/103 |
| 5,201,020 A | * | 4/1993 | Kannabiran | 385/113 |
| 5,222,180 A | * | 6/1993 | Kuder et al. | 385/115 |
| 5,359,687 A | * | 10/1994 | McFarland et al. | 385/49 |
| 6,122,426 A | * | 9/2000 | Ishikawa et al. | 385/105 |
| 6,374,023 B1 | * | 4/2002 | Parris | 385/109 |

OTHER PUBLICATIONS

Holman, J., et al., "Reliability Of Optical Fiber Cables For New Connector Systems," International Wire & Cable Symposium Proceedings 1994, pp. 795–801.

* cited by examiner

*Primary Examiner*—John R. Lee
*Assistant Examiner*—Mary El-Shammaa
(74) *Attorney, Agent, or Firm*—Bell, Boyd & Lloyd LLC

(57) ABSTRACT

A thermoplastic resin coated optical fiber having an outer diameter of 0.9 mm is formed by providing a coating layer around a reinforcing resin coated optical fiber having an outer diameter of 0.25 mm, and has a flexural rigidity of 5.5 to 7.5 N·mm$^2$. The coating layer comprises a thermoplastic resin having a bending elastic modulus of 200 to 350 MPa and the thermoplastic resin is a polyester elastomer. When optical fiber cords are connected to each other or when an optical fiber is exposed to low temperatures, loss is prevented from increasing and superior transmission characteristics are exhibited.

3 Claims, 4 Drawing Sheets

RESIN COATED OPTICAL FIBER

BACKGROUND OF THE INVENTION

1. Field of the Invention

The present invention relates to a resin coated optical fiber for an optical fiber cord, the resin coated optical fiber having superior connector insertion characteristics and low temperature characteristics when the resin coated optical fiber is used for an optical fiber cord.

2. Description of Related Art

As a resin coated optical fiber used for an optical fiber cord, conventionally, a resin coated optical fiber formed by coating a coating layer formed of a thermoplastic resin such as nylon 12 around a reinforcing resin coated optical fiber having an outer diameter of 0.4 to 0.5 mm so that the resin coated optical fiber has an outer diameter of 0.9 mm, is used. The reinforcing resin coated optical fiber is formed by coating a reinforcing layer such as silicone resin, UV curable resin, or the like, around a bare optical fiber having an outer diameter of 125 $\mu$m.

The above resin coated optical fiber, in particular, a thermoplastic resin coated optical fiber is formed to an optical fiber cord by longitudinally providing a tensile fiber composed of an aramid fiber and the like along the thermoplastic resin coated optical fiber, and providing an outer jacket composed of a resin such as polyvinyl chloride, nylon, or the like.

When one optical fiber cord is connected to another optical fiber cord, a connector is generally used. Various connectors having different structures are known. Among these, an "SC connector" will be explained as an example.

An SC connector is generally composed of two plugs which respectively fix one end of the first optical fiber cord and one end of the second optical fiber cord, which the cords are connected to each other, and an adaptor for engaging both plugs.

FIGS. 5A to 5C are schematic views of a state in which the end of the optical fiber cord is engaged in the plug of the above-described SC connector. Optical fiber cord 10 and plug 30 are shown in FIGS. 5A to 5C.

Plug 30 is composed of plug frame 32, spring 33, stop ring 34, caulking ring 35, caulking ring 36, rubber hood 37, and housing 38.

Outer jacket 12 and tensile fiber 14 of optical fiber cord 10 are peeled a predetermined length from the end of optical fiber cord 10, so that the predetermined distance of thermoplastic resin coated optical fiber 16 is exposed. Furthermore, tensile fiber 14 is pressed and closely fitted using caulking ring 35 and the outer jacket 12 is pressed and closely fitted using caulking ring 36.

In thermoplastic resin coated optical fiber 16, the reinforcing layer and the coating layer are peeled a predetermined length from the end (not shown) so as to expose the bare optical fiber, and the bare optical fiber is inserted into ferrule 20. Furthermore, receiving member 21 is provided around ferrule 20. Receiving member 21 is provided between ferrule 20 and stop ring 34. Spring 33 for pushing ferrule 20 toward the connection part of the connector to be connected the other connector is received by receiving member 21.

When the connector is not engaged to the other connector, as shown in FIG. 5A, the end surface 22 of ferrule 20 is pushed by spring 33 toward the connection part of the connector to be connected the other connecter, so that a predetermined length of the end portion of ferrule 20 protrudes from housing 38.

Furthermore, when the connector is engaged to the other connector, as shown in FIG. 5B, the end surface 22 of ferrule 20 (i.e., the first ferrule of the first plug) is pushed by the end surface of the second ferrule of the second plug (not shown) and is pushed toward an insertion port of plug 30. Then, spring 33 is contracted by receiving member 21, and the end surfaces of the first and second ferrules are pushed and closely contacted with each other by elasticity of spring 33, so that the connectors are satisfactorily engaged and this state is maintained. The length of ferrule 20 pushed toward the insertion port of plug 30 when the connectors are engaged is normally approximately 0.5 mm.

When the first and second optical fiber cords are connected to the connectors as described above, if thermoplastic resin coated optical fiber 16 has low flexural rigidity, as shown in FIG. 5C, ferrule 20 is pushed and subsequently thermoplastic resin coated optical fiber 16, which is placed behind ferrule 20, is bent. As a result, loss increases. In order to prevent thermoplastic resin coated optical fiber 16 from bending, flexural rigidity of the thermoplastic resin coated optical fiber used for the optical fiber cord is generally determined to be 18 to 25 N·mm².

In recent years, in order to actualize high speed drawing of the optical fiber and to improve productivity, as the above-described reinforcing resin coated optical fiber having an outer diameter of 0.25 mm is generally used. The reinforcing resin coated optical fiber is formed by coating the bare optical fiber with the reinforcing layer composed of a UV curable resin which can make the reinforcing layer thin and fast curing.

When the above reinforcing resin coated optical fiber having small diameter is used for the thermoplastic resin coated optical fiber having an outer diameter of 0.9 mm, there are some problems as follows.

(1) The thickness of the coating layer becomes thick. When the thremoplastic resin coated optical fiber is exposed to low temperatures, the amount of shrinkage of the coating layer increases. Accordingly, a slight bend is generated in the optical fiber, and then, loss increases.

(2) If a soft material is used for the coating layer of the thermoplastic resin coated optical fiber in order to prevent variation of loss under low temperatures, when the optical fiber cord manufactured from the thermoplastic resin coated optical fiber made by using the soft material is connected to the other optical fiber cord with the connector as described above, the peeled part of thermoplastic resin coated optical fiber 16 placed behind ferrule 20, tends to bend as shown in FIG. 5C, and therefore, loss may increase.

BRIEF SUMMARY OF THE INVENTION

In light of the above problems, an object of the present invention is to provide a thermoplastic resin coated optical fiber which prevents loss from increasing when the optical fiber cord is connected to another optical fiber cord using a connector or when exposed to low temperatures, and exhibits superior transmission characteristics, even if a reinforcing resin coated optical fiber having the outer diameter of 0.25 mm is used as a starting material for the thermoplastic resin coated optical fiber for an optical fiber cord.

The above object is solved by the following aspect of the present invention.

An aspect of the present invention is that a thermoplastic resin coated optical fiber having an outer diameter of 0.81 to 0.99 mm, comprising a reinforcing resin coated optical fiber having an outer diameter of 0.225 to 0.275 mm, wherein a coating layer is provided around the reinforcing resin coated optical fiber, and a flexural rigidity of the thermoplastic resin coated optical fiber is 5.5 to 7.5 N·mm².

According to the above aspect, an optical fiber cord obtained by sequentially providing a tensile fiber and the outer jacket around the thermoplastic resin coated optical fiber prevents loss from increasing when two optical fiber cords are connected to each other using a connector. Furthermore, loss is prevented from increasing under low temperatures.

Furthermore, according to the above aspect, the thermoplastic resin coated optical fiber has sufficient transmission characteristics. At the same time, the outer diameter of the reinforcing resin coated optical fiber used for the thermoplastic resin coated optical fiber is more slender than that of a conventional optical fiber, and is formed by high-speed drawing, and therefore, productivity of the thermoplastic resin coated optical fiber is improved.

The coating layer may comprise a thermoplastic resin having a bending elastic modulus of 200 to 350 MPa. Accordingly, the flexural rigidity of the thermoplastic resin coated optical fiber is maintained within 5.5 to 7.5 N·mm².

Furthermore, polyester elastomer may be used as the thermoplastic resin.

The outer diameter of the reinforcing resin coated optical fiber generally has a dispersion of ±10% to the standard values through manufacturing processes, and similarly, the outer diameter of the thermoplastic resin coated optical fiber has a dispersion of ±10% to the standard values. Accordingly, in the reinforcing resin coated optical fiber and the thermoplastic resin coated optical fiber of the present invention, these outer diameters are usually 0.25 mm and 0.9 mm respectively, but these have dispersions of ±10%. The outer diameter of the reinforcing resin coatd optical fiber is 0.225 to 0.275 mm and the outer diameter of the thermoplastic resin coated optical fiber is 0.81 to 0.99 mm.

DETAILED DESCRIPTION OF THE INVENTION

An embodiment of the present invention will be explained as follows.

Figure 1:
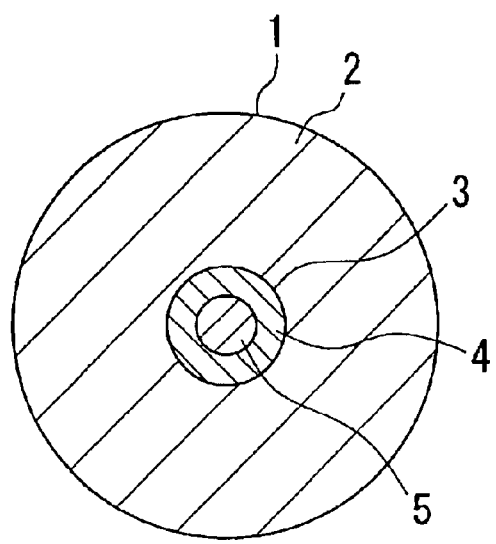
FIG. 1 is a schematic cross-sectional view showing an example of a thermoplastic resin coated optical fiber according to the present invention.

FIG. 1 is a schematic cross-sectional view of a thermoplastic resin coated optical fiber according to the present invention. Thermoplastic resin coated optical fiber 1 is formed by providing coating layer 2 around reinforcing resin coated optical fiber 3. Reinforcing resin coated optical fiber 3 is formed by providing reinforcing layer 4 around bare optical fiber 5.

Figure 5A:
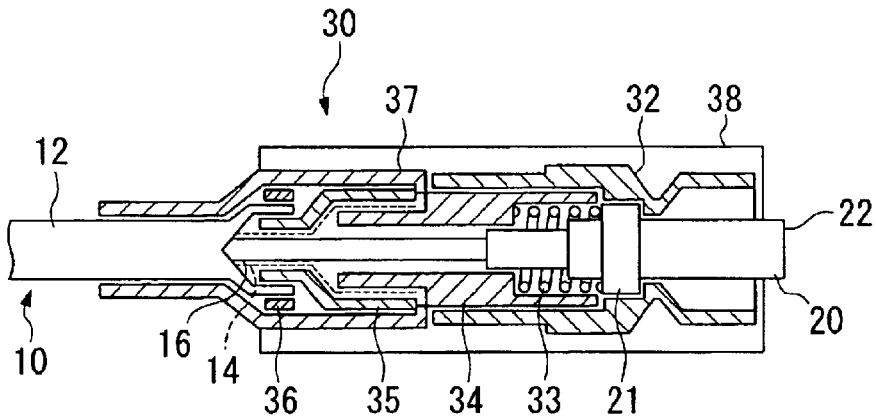
FIG. 5A is a view showing a state in which the optical fiber cord is connected to a plug of a connector according to the present invention.
Figure 5B:
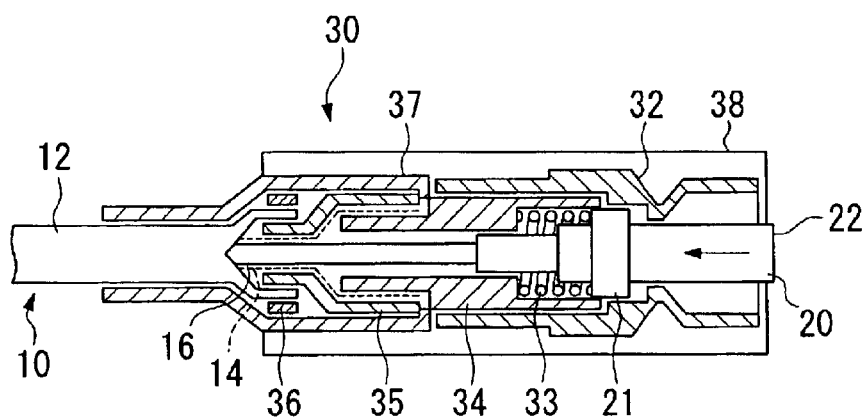
FIG. 5B is a view showing another state in which the optical fiber cord is connected to the plug of the connector according to the present invention.
Figure 5C:
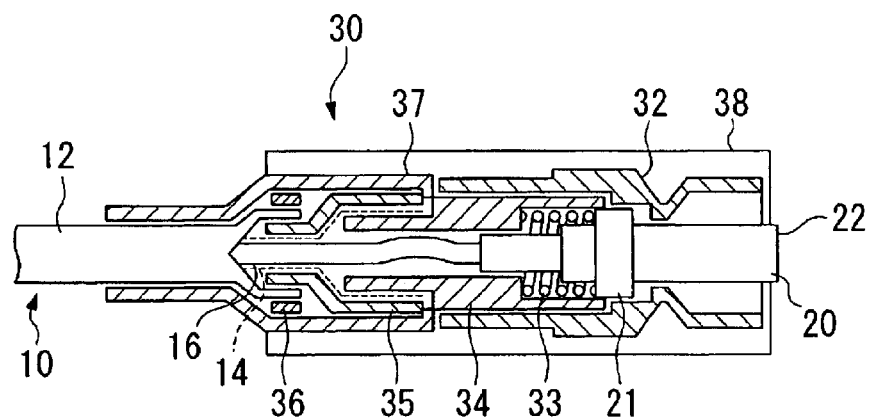
FIG. 5C is a view showing another state in which the optical fiber cord is connected to the plug of the connector according to the present invention.

Particularly, thermoplastic resin coated optical fiber 1 of the present invention having an outer diameter of 0.9 mm is formed by providing a coating layer around reinforcing resin coated optical fiber 3 having an outer diameter of 0.25 mm. Furthermore, thermoplastic resin coated optical fiber 1 has a flexural rigidity of 5.5 to 7.5 N·mm². As described with reference to FIGS. 5A to 5C above, when the optical fiber cords are connected to each other using a connector, the end surface of a ferrule is pushed by the end surface of the other ferrule, so that the ferrule is pushed toward the insertion port of the connector. Then, thermoplastic resin coated optical fiber 1 which is placed behind the ferrule tends to bend. If flexural rigidity of thermoplastic resin coated optical fiber 1 is determined to be 5.5 N·mm² or more, thermoplastic resin coated optical fiber 1 is prevented from bending when the ferrule is pushed, and loss is prevented from increasing when the optical fiber cords are connected to each other using the connector.

Furthermore, when thermoplastic resin coated optical fiber 1 is exposed to low temperatures, coating layer 2 shrinks so that reinforcing resin coated optical fiber 3 is compressed. If this compression is too great, reinforcing resin coated optical fiber 3 tends to bend locally, so that loss increases. If flexural rigidity of thermoplastic resin coated optical fiber 1 is predetermined to be 7.5 N·mm² or less, the compression to reinforcing resin coated optical fiber 3 is relaxed, so that loss is prevented.

If flexural rigidity of thermoplastic resin coated optical fiber 1 is less than 5.5 N·mm², loss increases when the optical fiber cords are connected to each other using the connector. Furthermore, if flexural rigidity of thermoplastic resin coated optical fiber 1 is more than 7.5 N·mm², loss increases when thermoplastic resin coated optical fiber 1 is exposed to low temperatures, and this is undesirable.

According to the present invention, as the above-described reinforcing resin coated optical fiber 3, a reinforcing resin coated opical fiber having an outer diameter of 0.2 mm, which is more slender than the outer diameter of a conventional reinforcing resin coated optical fiber, may be used as long as flexural rigidity of its thermoplastic resin coated optical fiber 1 is within 5.5 to 7.5 N·mm². In the obtained thermoplastic resin coated optical fiber 1, loss, which is generated when the optical fiber cords are connected to each other using the connector or when thermoplastic resin coated optical fiber 1 is used under low temperatures, is prevented from increasing, so that superior transmission characteristics are exhibited. Therefore, high-speed drawing of the optical fiber is realized, so that productivity can be improved.

The above-described reinforcing resin coated optical fiber is formed by coating UV curable resin such as urethane acrylate, epoxy acrylate, and the like around bare optical fiber 5.

Furthermore, as material of the above-described material for coating layer 2, thermoplastic resin having a bending elastic modulus of 200 to 350 MPa is satisfactorily used in order to maintain thermoplastic resin coated optical fiber 1 having flexural rigidity within 5.5 to 7.5 N·mm$^2$.

Moreover, as the above-described thermoplastic resin, polyester elastomer may be used. Polyester elastomer is a thermoplastic elastomer of a block copolymer composed of a hard segment of polyester and a soft segment of polyether. Since the ratio of the amounts of the hard segment and the soft segment may be altered, the bending elastic modulus of polyester elastomer may be varied over a wide range.

Next, the present invention will be explained with reference to the embodiments.

An embodiment of a relationship between flexural rigidity of thermoplastic resin coated optical fiber 1 and an amount of loss when optical fiber cords are connected to each other using a connector will be explained. An optical fiber cord was formed by longitudinally providing tensile fiber around thermoplastic resin coated optical fiber 1, and subsequently, extruding the outer jacket around thermoplastic resin coated optical fiber 1 provided with tensile fiber therearound.

Thermoplastic resin coated optical fiber 1, to be used in the following embodiments, was formed by coating four kinds of polyester elastomers around a thermoplastic resin coated optical fiber having an outer diameter of 0.25 mm so as to have an outer diameter of 0.9 mm.

Figure 2:
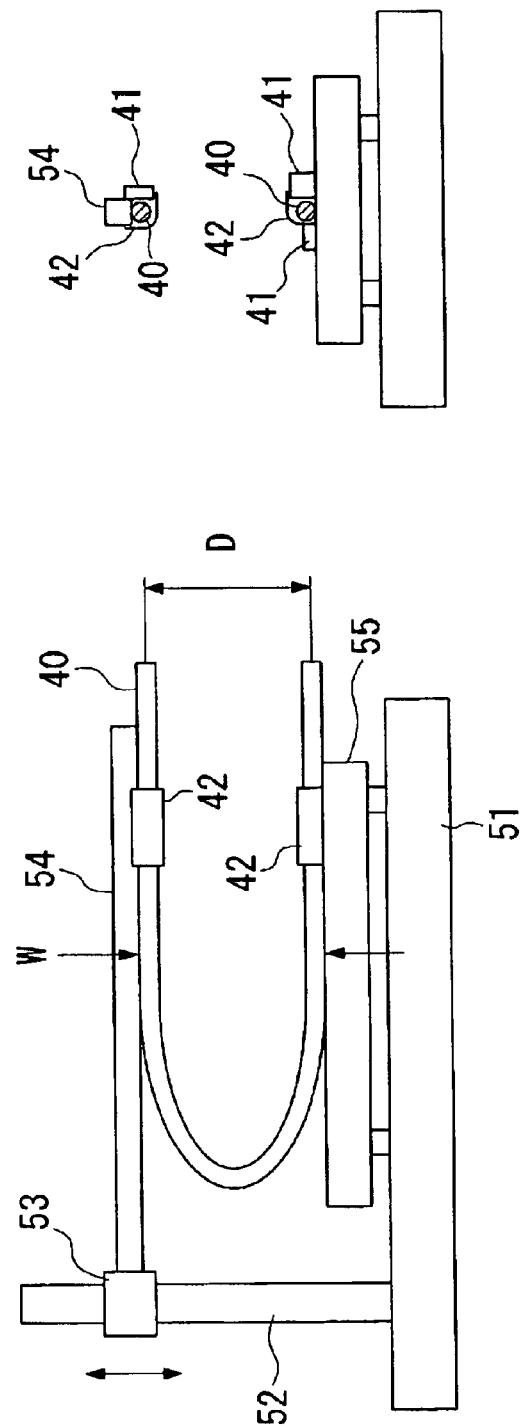
FIG. 2A is a cross-sectional view showing an example of a measuring device for measurement of flexural rigidity of the thermoplastic resin coated optical fiber according to the present invention.
FIG. 2B is a longitudinal sectional view showing an example of a measuring device for measurement of flexural rigidity of the thermoplastic resin coated optical fiber according to the present invention.

Flexural rigidity of thermoplastic resin coated optical fiber 1 was measured by a two-point bending method. An embodiment of a measuring device used in the two-point bending method is shown in FIGS. 2A and 2B.

The measuring device is roughly composed of surface plate 51, post 52 provided on surface plate 51, linear strip plate 54, and slider 53 provided on one end of linear strip plate 54.

Thermoplastic resin coated optical fiber 40 is provided between guide members 41, and fixed along linear strip plate 54 or balance 55 with tape 42. Balance 55 is provided on surface plate 51. Thermoplastic resin coated optical fiber 40 is bent by putting it between linear strip plate 54 and a weighting plate of balance 55 so as to have a U-shape. At this time, repulsive force W (kg) of thermoplastic resin coated optical fiber 40 is measured and flexural rigidity EI (N·mm$^2$) is calculated using the value of repulsive force W by theoretical equation. The outer diameters of thermoplastic resin coated optical fiber 40 taken from the length between linear strip plate 54 and the weighting plate of balance 55 is determined as bending length D (mm), and then flexural rigidity EI is calculated from the following expression (I).

$$EI = 3.413 WD^2 \quad (I)$$

In this test, bending length D was determined to be 20 mm, and bending tests were carried out three times. The results were averaged, and the averaged value is adopted as the value of flexural rigidity.

Figure 3:
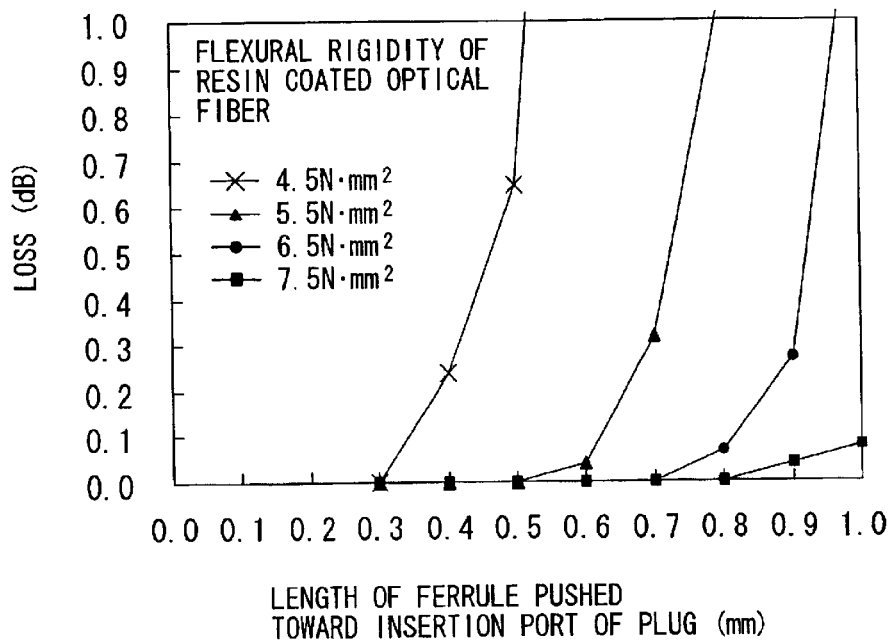
FIG. 3 is a graph showing an example of a relationship between flexural rigidity of the thermoplastic resin coated optical fiber and an amount of loss when optical fiber cords are connected to each other using a connector.

Furthermore, an optical fiber cord having an outer diameter of 1.7 mm was manufactured by longitudinally providing three aramid resin fibers having 1140 deniers as a high tensile fiber around the thermoplastic resin coated optical fiber, and subsequently, extruding nylon as the outer jacket around the thermoplastic resin coated optical fiber. The end part of the coating of the optical fiber cord was peeled and connected to a plug of the connector. In this state, loss, when the ferrule was compressed and pushed a predetermined distance by the other optical fiber cord, was measured. The results are shown in FIG. 3.

When optical fiber cords are connected to each other using a connector, each ferrule is usually pushed approximately 0.5 mm. Therefore, if flexural rigidity of the thermoplastic resin coated optical fiber is 5.5 N·mm$^2$ or more, loss can be sufficiently prevented. Furthermore, if flexural rigidity of the thermoplastic resin coated optical fiber is 4.5 N·mm$^2$, large loss is generated when the ferrule is pushed approximately 0.5 mm, and this is undesirable.

Next, an example of a relationship between flexural rigidity of the thermoplastic resin coated optical fiber and an amount of loss when the thermoplastic resin coated optical fiber is exposed to low temperatures will be explained as follows.

Five test samples of thermoplastic resin coated optical fibers were formed by coating five kinds of polyester elastomers around the reinforcing resin coated optical fiber having an outer diameter of 0.25 mm so that each thermoplastic resin coated optical fiber had an outer diameter of 0.9 mm. Loss of the thermoplastic resin coated optical fiber exposed to −40° C. was measured. The results are shown in FIG. 4.

Figure 4:
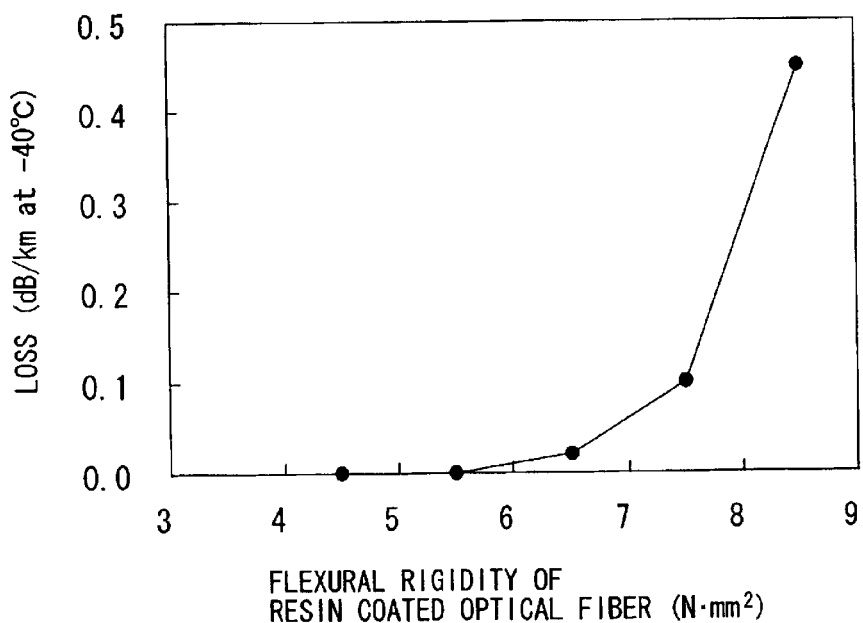
FIG. 4 is a graph showing an example of a relationship between flexural rigidity of the thermoplastic resin coated optical fiber and an amount of loss when the optical fiber cord is exposed to low temperatures.

It is clear from FIG. 4 that if flexural rigidity of the thermoplastic resin coated optical fiber is 7.5 N·mm$^2$ or less, loss when the thermoplastic resin coated optical fiber is exposed to −40° C. can be held to 0.1 dB/km or less.

Next, an example of a relationship between bending elastic modulus of a material for a coating layer and flexural rigidity of the themroplastic resin coated optical fiber will be explained as follows.

Seven test samples of themroplastic resin coated optical fibers were manufactured by coating six kinds of polyester elastomers and one kind of polyamide (nylon 12), which had different flexural elastic modulus, around the reinforcing resin coated optical fibers having an outer diameter of 0.25 mm so that each thermoplastic resin coated optical fiber had an outer diameter of 0.9 mm. Flexural rigidity of each thermoplastic resin coated optical member was measured. The results are shown in Table 1.

TABLE 1

| Test number | Material for coating layer | Bending elastic modulus (MPa) (material for coating layer) | Flexural rigidity (N · mm$^2$) (thermoplastic resin coated optical fiber) |
|---|---|---|---|
| 1 | Polyester elastomer (a) | 110 | 3.5 |
| 2 | Polyester elastomer (b) | 150 | 4.5 |
| 3 | Polyester elastomer (c) | 200 | 5.5 |
| 4 | Polyester elastomer (d) | 260 | 6.5 |
| 5 | Polyester elastomer (e) | 350 | 7.5 |
| 6 | Polyester elastomer (f) | 700 | 16.0 |
| 7 | Nylon 12 | 1000 | 24.0 |

Note: Polyester elastomers (a) to (f) are (multi-)block copolymers having polybutylene terephthalate (PBT) as hard-segments and polyether as soft-segments. The hard-segments and soft-segments have different bending elastic moduli.

It is clear from Table 1 that if bending elastic modulus of the material for the coating layer is within 200 to 350 MPa, the thermoplastic resin coated optical fiber, which is formed by coating the material for the coating layer around the reinforcing resin coated optical member, has flexural rigidity of 5.5 to 7.5 N·mm$^2$.

What is claimed is:

1. A thermoplastic resin coated optical fiber having an outer diameter of 0.81 to 0.99 mm, comprising a reinforcing resin coated optical fiber having an outer diameter of 0.225 to 0.275 mm, wherein a coating layer is provided around the reinforcing resin coated optical fiber, and a flexural rigidity of the thermoplastic resin coated optical fiber is 5.5 to 7.5 N·mm$^2$.

2. A thermoplastic resin coated optical fiber according to claim 1, wherein the coating layer comprises a thermoplastic resin having a bending elastic modulus of 200 to 350 MPa.

3. A thermoplastic resin coated optical fiber according to claim 2, wherein the thermoplastic resin is a polyester elastomer.

* * * * *